(12) United States Patent
Shoji et al.

(10) Patent No.: US 10,988,024 B2
(45) Date of Patent: Apr. 27, 2021

(54) DISPLAY DEVICE

(71) Applicant: Yazaki Corporation, Tokyo (JP)

(72) Inventors: Kazumasa Shoji, Shizuoka (JP); Ryoko Sone, Shimada (JP); Yousuke Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/879,565

(22) Filed: Jan. 25, 2018

(65) Prior Publication Data
US 2018/0215266 A1     Aug. 2, 2018

(30) Foreign Application Priority Data

Jan. 31, 2017 (JP) .............................. JP2017-015355

(51) Int. Cl.
| | |
|---|---|
| *B60K 37/02* | (2006.01) |
| *B60K 35/00* | (2006.01) |
| *G06T 5/00* | (2006.01) |

(52) U.S. Cl.
CPC .............. *B60K 37/02* (2013.01); *B60K 35/00* (2013.01); *G06T 5/003* (2013.01);
(Continued)

(58) Field of Classification Search
CPC .. B60K 35/00; B60K 37/02; B60K 2350/352; B60K 2350/965; B60K 2350/1072; B60K 2350/408; G06T 2207/20201; G06T 5/003

See application file for complete search history.

(56) References Cited

U.S. PATENT DOCUMENTS

| | | | |
|---|---|---|---|
| 6,956,576 B1 * | 10/2005 | Deering | ................. G06T 15/00 345/475 |
| 8,384,619 B2 | 2/2013 | Shirakura et al. | |

(Continued)

FOREIGN PATENT DOCUMENTS

| | | |
|---|---|---|
| JP | 2006-10325 A | 1/2006 |
| JP | 2007-303894 A | 11/2007 |

(Continued)

OTHER PUBLICATIONS

Communication dated Apr. 16, 2019 by the Japanese Patent Office in counterpart application No. 2017-015355.

*Primary Examiner* — Charles V Hicks
(74) *Attorney, Agent, or Firm* — Sughrue Mion, PLLC (57) ABSTRACT

A display device is configured to, when displaying an indicator needle as rotating with a relatively small rotation amount per unit time, display an indicator needle image while rotating the indicator needle image, and, when displaying the indicator needle as rotating with a relatively large rotation amount per unit time, display an indicator-needle motion-blurred image that corresponds to a rotation range per unit time of the indicator needle. An indicator-needle inner end angle formed by two sides of the indicator needle image that form an end thereof that faces a center of the rotation is equal to a minimum motion-blurred inner end angle formed by two sides of the indicator-needle motion-blurred image that has the smallest rotation amount per unit time while the indicator needle is displayed as rotating, the two sides forming an end of the indicator-needle motion-blurred image that faces the center of the rotation.

5 Claims, 5 Drawing Sheets

(52) U.S. Cl.
CPC .. *B60K 2370/155* (2019.05); *B60K 2370/193* (2019.05); *B60K 2370/52* (2019.05); *B60K 2370/698* (2019.05); *G06T 2207/20201* (2013.01)

(56) References Cited

U.S. PATENT DOCUMENTS

| | | | |
|---|---|---|---|
| 9,569,867 B2* | 2/2017 | Stevens | G06T 11/206 |
| 2008/0018597 A1 | 1/2008 | Shirakura et al. | |
| 2009/0102787 A1* | 4/2009 | Okumura | B60K 35/00 |
| | | | 345/157 |
| 2010/0026827 A1* | 2/2010 | Kobayashi | H04N 5/235 |
| | | | 348/222.1 |
| 2018/0108117 A1 | 4/2018 | Maeda et al. | |

FOREIGN PATENT DOCUMENTS

| | | |
|---|---|---|
| JP | 2007-309719 A | 11/2007 |
| JP | 2009-103473 A | 5/2009 |
| WO | 2010067807 A1 | 6/2010 |

* cited by examiner

DISPLAY DEVICE

CROSS-REFERENCE TO RELATED APPLICATION(S)

The present application claims priority to and incorporates by reference the entire contents of Japanese Patent Application No. 2017-015355 filed in Japan on Jan. 31, 2017.

BACKGROUND OF THE INVENTION

1. Field of the Invention

The present invention relates to a display device.

2. Description of the Related Art

As conventional display devices applied to vehicles, for example, a display device disclosed in Japanese Patent Application Laid-open No. 2009-103473 includes a display panel on which an indicator needle image and track images can be displayed that represent an indicator needle and tracks along which the indicator image has moved, respectively, and a controller configured to control a display status of the display panel so that displayed images can be sequentially switched from one to another of the indicator needle image and the track images over a plurality of frames.

The above-described display device disclosed in Japanese Patent Application Laid-open No. 2009-103473, however, has room for improvement in terms of more appropriate display of the indicator needle, such as reduction in incongruity that is felt when displayed images are switched from one to another of the indicator needle image and the track images.

SUMMARY OF THE INVENTION

The present invention has been made in consideration of the above situation, and an object of the present invention is to provide a display device capable of appropriately displaying the indicator needle.

In order to achieve the above mentioned object, a display device according to one aspect of the present invention includes a display unit that displays an image, a storage unit configured to store therein an indicator needle image representing an indicator needle, and an indicator-needle motion-blurred image representing an afterimage that the indicator needle makes when rotating, and a controller configured to control the display unit in a manner such that, when the indicator needle is displayed as rotating with a relatively small rotation amount per unit time, the indicator needle image is displayed while being rotated, and when the indicator needle is displayed as rotating with a relatively large rotation amount per unit time, the indicator-needle motion-blurred image that corresponds to a rotation range per unit time of the indicator needle is displayed, wherein the indicator needle image has a shape tapering toward a center of rotation thereof, and an indicator-needle inner end angle formed by two sides of the indicator needle image that form an end thereof that faces the center of the rotation is equal to a minimum motion-blurred inner end angle formed by two sides of the indicator-needle motion-blurred image that has the smallest rotation amount per unit time while the indicator needle is displayed as rotating, the two sides forming an end of the indicator-needle motion-blurred image that faces the center of the rotation.

According to another aspect of the present invention, in the display device, when the rotation amount per unit time of the indicator needle being displayed as rotating has increased to a first threshold value or more, the controller controls the display unit in a manner such that an image displayed on the display unit is switched from the indicator needle image to the indicator-needle motion-blurred image, and when the rotation amount per unit time of the indicator needle being displayed as rotating has become a second threshold value or less, the controller controls the display unit in a manner such that an image displayed on the display unit is switched from the indicator-needle motion-blurred image to the indicator needle image, the second threshold value being smaller than the first threshold value, and the minimum motion-blurred inner end angle is an angle formed by two sides of the indicator-needle motion-blurred image that is displayed immediately before the displayed image is switched from the indicator-needle motion-blurred image to the indicator needle image in response to decrease to the second threshold value or less of a rotation amount per unit time of the indicator needle being displayed as rotating, the two sides forming an inner end of the indicator-needle motion-blurred image, the inner end being close to the center of the rotation.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

The following describes an embodiment according to the present invention in detail based on the drawings. This embodiment is not intended to limit the invention. Components included in the following embodiments may include a component that the skilled person can easily replace with a different component, and may include components substantially the same as each other.

Embodiment

Figure 1:
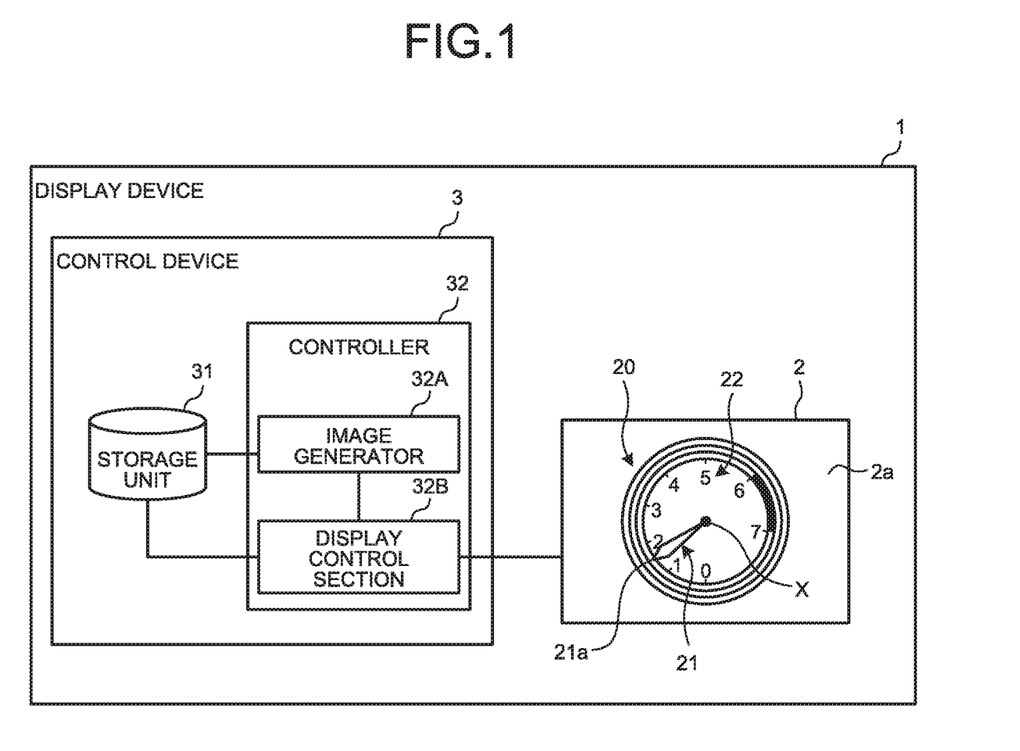
FIG. 1 is a block diagram illustrating a schematic configuration of a display device according to an embodiment.

A display device 1 according to the present embodiment shown in FIG. 1 is employed, for example, for a vehicle, and is included as a component in an in-vehicle meter employed for the vehicle. The display device 1 is installed in, for example, an instrument panel provided in a dashboard of the vehicle, and displays thereon various kinds of vehicle information that serve for driving of the vehicle.

Specifically, as illustrated in FIG. 1, the display device 1 includes a display unit 2 and a control device 3.

The display unit 2 is installed in the vehicle to display images on an image display surface 2a. The display unit 2 can be constructed using, for example, a liquid crystal display (liquid crystal panel) that employs thin film transistors (TFTs) but is not limited to this example, and can alternatively be constructed using a display such as a plasma display or an organic electroluminescence (EL) display. The display unit 2 in this embodiment displays a meter image 20 representing at least one indicator needle that rotates about an axis line X, and various different measured values about the vehicle with index parts, such as a scale, on each of which the indicator needle points to a value. The meter image 20 is an image representing at least one among various meters such as a speedometer that indicates a vehicle speed of the vehicle in which the display device 1 is installed, and a tachometer that indicates the number of output revolutions of a power source for running the vehicle. FIG. 1 illustrates, as an example, an image that represents a tachometer. The meter image 20 includes an indicator needle image 21 representing the indicator needle that rotates about the axis line X, and an index part image 22 representing an index part on which the indicator needle image 21 points to a value. The meter image 20 indicates various different measured values about the vehicle with the indicator needles, which are represented by the respective indicator needle images 21, pointing to certain positions on the respective index parts represented by the index part images 22. At the same time as indicating the measured values, the display unit 2 may display images about vehicle information on the vehicle such as images about various kinds of information that change momentarily, such as the speed of the vehicle, the accumulated traveled distance, the temperature of cooling water, the number of output revolutions of the power source for running the vehicle, the remaining amount of fuel, the amount of power stored in the battery, navigation information, map information, and information on intersections; and various images, such as various patterns, signs, and character strings, according to vehicle information indicated by, for example, various warning lamps (what are called telltales), a shift-lever position indicator, and a direction indication sign.

The control device 3 is configured to control the display unit 2, thereby controlling display that the display unit 2 performs. Typically, the control device 3 stores images to be displayed by the display unit 2 and controls the images. The control device 3 may be constructed of, for example, an electronic control unit (ECU) that centrally controls individual units of the vehicle and that doubles as the control device 3. Alternatively, the control device 3 may be constructed separately from the ECU and configured to exchange information in the form of detection signals, drive signals, control commands, and the like with the ECU. The control device 3 includes electronic circuitry the main part of which is a known microcomputer that includes a central processing unit (CPU), a read-only memory (ROM), a random access memory (RAM), and an interface. Various pieces of equipment that detect states of the vehicle, such as sensors and detectors, are electrically coupled to the control device 3, so that electric signals according to detection results are input to the control device 3. The control device 3 is electrically coupled to the display unit 2 and outputs drive signals to the display unit 2. The control device 3 executes a control program stored in, for example, the ROM or the RAM based on various input signals input from the various pieces of equipment, such as sensors and detectors, to output drive signals to the display unit 2, thus executing various kinds of processing for controlling images that the display unit 2 displays.

Figure 2:
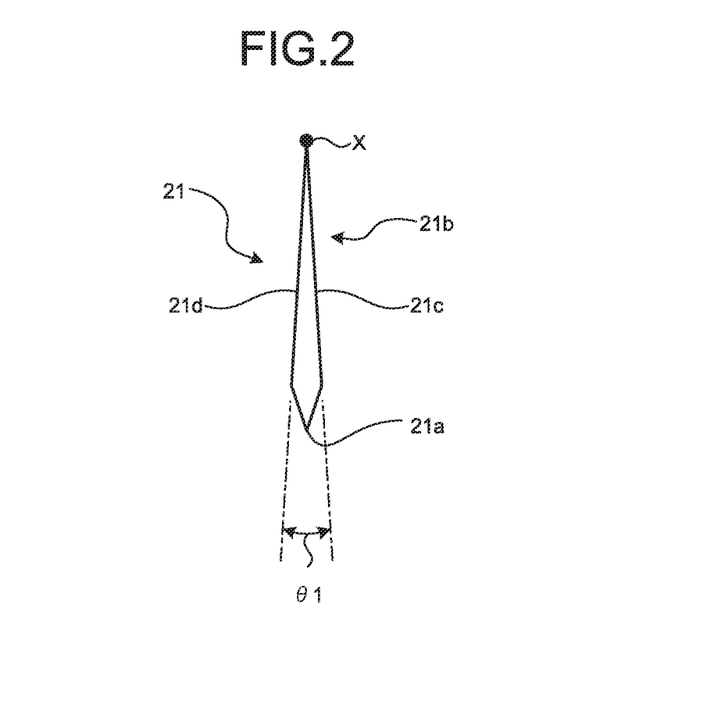
FIG. 2 is a schematic diagram illustrating an example of an indicator needle image on the display device according to the embodiment.
Figure 3:
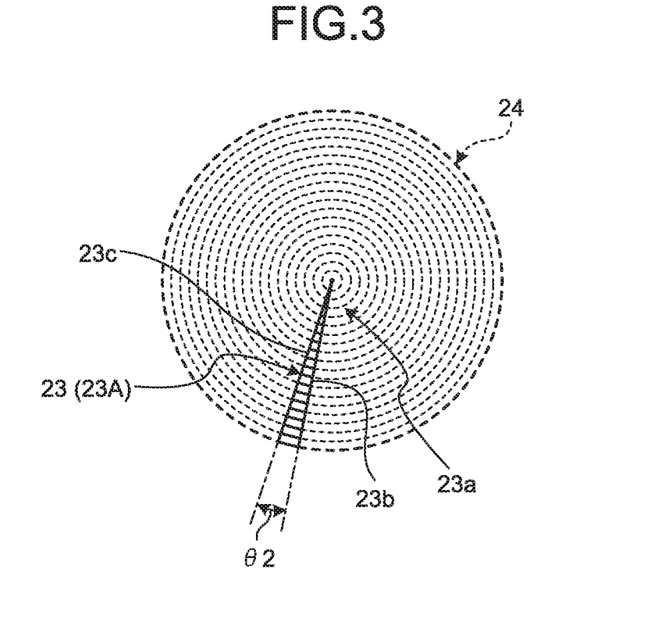
FIG. 3 is a schematic diagram illustrating an example of an indicator-needle motion-blurred image displayed on the display device according to the embodiment.
Figure 4:
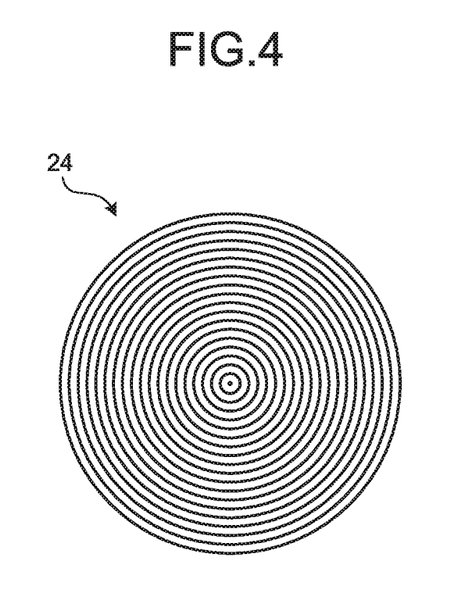
FIG. 4 is a schematic diagram illustrating an example of an entire indicator-needle motion-blurred image displayed on the display device according to the embodiment.

As illustrated in FIG. 1, when displaying various measured values about the vehicle indicated by the meter image 20, the control device 3 in this embodiment displays the corresponding index part image 22 while keeping it unmoving. The control device 3 represents the movement of each indicator needle by dynamically displaying images while switching the images from one to another of the indicator needle image 21 illustrated in FIG. 2 and the indicator-needle motion-blurred image 23 illustrated in FIG. 3. In this case, the control device 3 dynamically displays images while switching the images from one to another of the indicator needle image 21 and the indicator-needle motion-blurred images 23 in accordance with the rotation speed (in other words, rotation amount per unit time) of an indicator needle needing to be represented, thereby making it possible to appropriately display the indicator needle. The indicator-needle motion-blurred image 23 herein indicates an image representing an afterimage of an indicator needle represented by the indicator needle image 21. The indicator-needle motion-blurred image 23 in this embodiment is generated based on an entire indicator-needle motion-blurred image 24 as illustrated in FIG. 3 and FIG. 4.

Specifically, the control device 3 functionally conceptually includes a storage unit 31 and a controller 32 as illustrated in FIG. 1.

The storage unit 31 is a storage device such as a memory. The storage unit 31 has conditions and data that are needed for various kinds of processing to be performed by the control device 3, and various computer programs that are executed by the control device 3, stored therein. The storage unit 31 also has image data stored therein that represents images to be displayed on the display unit 2. The storage unit 31 in this embodiment has image data stored therein as data for constructing the above-described meter image 20, the image data including data for the indicator needle image 21 illustrated in FIG. 1 and FIG. 2, the index part image 22 illustrated in FIG. 1, and the entire indicator-needle motion-blurred image 24 illustrated in FIG. 4. The indicator needle image 21 is an image previously stored in the storage unit 31 and is an image that represents a rotating indicator needle that is displayed as rotating about the axial line X, as illustrated in FIG. 1 and FIG. 2. The indicator needle image 21 illustrated in FIG. 1 and FIG. 2 has a shape that tapers both toward one side thereof opposite to the rotation center (the axial line X) and the other side thereof facing the rotation center (axial line). That is, the indicator needle image 21 is a needle-shaped image that tapers on one side thereof having an outer end 21a, that is, an end thereof opposite to the rotation center, and tapers also on the other side thereof having an inner end 21b, that is, an end thereof facing the rotation center. As illustrated in FIG. 1, the index part image 22 is an image previously stored in the storage unit 31, and is an image having components such as an arc drawn along the locus of rotation of the outer end 21a of the indicator needle image 21, a plurality of scale marks provided at uniform intervals along the arc, and digits. As illustrated in FIG. 4, the entire indicator-needle motion-blurred image 24 is an image previously stored in the storage unit 31, and is an image representing an afterimage of the indicator needle represented by the indicator needle image 21, the afterimage corresponding to the entire possible rotation range thereof. The entire indicator-needle motion-blurred image 24 herein is formed as an image having a shape of a substantially perfect circle in a range corresponding to a rotation angle (an angle about the rotation center (the shaft line X)) of 360 degrees. The indicator-needle motion-blurred image 23 is generated based on this entire indicator-needle motion-blurred image 24 as described later in detail. The entire indicator-needle motion-blurred image 24 corresponds to an image obtained as the aggregate of the indicator-needle motion-blurred images 23 corresponding to respective rotation ranges of the indicator needle. That is, the storage unit 31 in this embodiment stores therein the indicator-needle motion-blurred images 23 corresponding to respective rotation ranges in the form of the entire indicator-needle motion-blurred image 24. The entire indicator-needle motion-blurred image 24 illustrated in FIG. 4 is depicted as an afterimage composed of concentric circles that is a schematic of an afterimage that appears when the indicator needle represented by the indicator needle image 21 rotates. However, the entire indicator-needle motion-blurred image 24 may be determined as appropriate in accordance with the design of the indicator needle represented by the indicator needle image 21, and may be gradationally shaded in accordance with the design of the indicator needle. The shape of the indicator needle image 21 is described later in more detail.

The controller 32 is configured to control the display unit 2 and thereby execute various kinds of processing for displaying images stored in the storage unit 31 on the display unit 2. The controller 32 in the embodiment is capable of executing processing that enables the meter image 20 to indicate a measured value (in this case, the number of output revolutions of the power source for running the vehicle) about the vehicle. The controller 32 sequentially updates frames (corresponding to still images each serving as a unit constituting a video) every unit time, the frames each including the indicator needle image 21 or any one of the indicator-needle motion-blurred images 23, thereby displaying the indicator needle as rotating on the image display surface 2a of the display unit 2. The unit time herein means any desired period of time that is previously determined, and typically is a period of time corresponding to each control cycle. That is, the controller 32 sequentially updates frames set for the respective predetermined control cycles (unit times) and each including the indicator needle image 21 or any one of the indicator-needle motion-blurred images 23, thereby displaying the indicator needle as rotating.

As described above, the controller 32 in this embodiment dynamically displays images by switching the images from one to another of the indicator needle image 21 and the indicator-needle motion-blurred images 23 in accordance with the rotation speed of an indicator needle image needing to be represented. More specifically, the controller 32 controls the display unit 2 so that, when the indicator needle is displayed as rotating in a relatively small rotation amount per unit time, the indicator needle image 21 can be displayed while being rotated. In contrast, the controller 32 controls the display unit 2 so that, when the indicator needle is displayed as rotating with a relatively large rotation amount per unit time, the indicator-needle motion-blurred image 23 that corresponds to the rotation range per unit time can be displayed.

Here, a rotation amount and a rotation range per unit time that are reached when the indicator needle is displayed as rotating are, for example, measured values (in this case, the number of output revolutions of the power source for running the vehicle) to be indicated by the meter image 20 that have been sampled by various pieces of equipment such as sensors and detectors during each unit time (control cycle) and have been input from higher-level equipment such as an ECU. For example, based on the input measured values, the controller 32 calculates the difference between an indicating angle (a rotation angle of the indicator needle from the position thereof indicating that a measured value is 0) of the indicator needle that corresponds to a measured value for a unit time previous to the most recent unit time and an indicating angle of the indicator needle that corresponds to a measured value for the most recent unit time, thereby being able to calculate the rotation amount for the most recent unit time. That is, the rotation amount per unit time of the indicator needle corresponds to the amount of angular change from the previous indicating angle of the indicator needle to the most recent indicating angle of the indicator needle. The rotation amount per unit time of the indicator needle is a value corresponding to the rotation speed of the indicator needle to be represented, and indicates a higher rotation speed when being larger and a lower rotation speed when being smaller. While an indicating angle of the indicator needle that corresponds to a measured value for the previous unit time corresponds to a start point position of the indicator needle for the most recent unit time, the indicating angle of the indicator needle that corresponds to a measured value for the most recent unit time corresponds to an end point position for the most recent unit time. A rotation range per unit time that is reached when the indicator needle is displayed as rotating is determined by a rotation amount, a start point position, an end point position, and the like of the indicator needle for the most recent unit time.

With the indicator needle image 21 being displayed, if the rotation amount per unit time of the indicator needle being displayed as rotating has increased to a first threshold value or more, the controller 32 controls the display unit 2 so that displayed images thereon can be switched from the indicator needle image 21 to one of the indicator-needle motion-blurred images 23. In contrast, with one of the indicator-needle motion-blurred images 23 being displayed, if the rotation amount per unit time of the indicator needle being displayed as rotating has decreased to a second threshold value smaller than the first threshold value, or less, the controller 32 controls the display unit 2 so that displayed images can be switched from the indicator-needle motion-blurred image 23 to the indicator needle image 21. In this control, the controller 32 uses the second threshold value smaller than the first threshold value, thereby being able to, when displayed images are switched either from the indicator needle image 21 to one of the indicator-needle motion-blurred images 23 or from one of the indicator-needle motion-blurred images 23 to the indicator needle image 21, make the switching congruent.

In one example, the controller 32 in the embodiment functionally conceptually includes an image generator 32A and a display control section 32B as illustrated in FIG. 1. The storage unit 31, the image generator 32A, and the display control section 32B are capable of exchanging various kinds of information with various apparatuses that are electrically coupled to these units.

The image generator 32A is a unit configured to generate display image data that is image data to be displayed on the display unit 2. The image generator 32A reads out image data from the storage unit 31 and, based on the image data thus read out, generates display image data to be displayed on display unit 2 eventually. The image generator 32A, for example, sequentially generates display image data for frames set for the respective predetermined control cycles (unit times).

The display control section 32B is a unit configured to control the display unit 2 to control images to be displayed on the display unit 2. The display control section 32B in this embodiment controls the display unit 2 based on display image data generated by the image generator 32A, to dynamically display images, such as those related to the indicator needle, on the display unit 2.

For example, the image generator 32A calculates the rotation amount, the start point position, the end point position, and the like of the indicator needle for the most recent unit time (control cycle) based on the input measured values as described above. Based on the calculated rotation amount per unit time, the first threshold value, the second threshold value, and the like, the image generator 32A then determines which of the indicator needle image 21 or the indicator-needle motion-blurred image 23 is to be displayed.

In order to display the indicator needle image 21 while rotating the indicator needle image 21, the image generator 32A generates the indicator needle images 21 that have been rotated to certain respective rotational positions, based on the rotation amounts per unit time, the start point positions, and the end point positions of the indicator needle that have been calculated, the indicator needle image 21 stored in the storage unit 31, and the like. More specifically, based on the rotation amounts per unit time, the start point positions, and the end point positions of the indicator needle that have been calculated, and the like, the image generator 32A sequentially generates the indicator needle images 21 that have been rotated to certain respective rotational positions with respect to a plurality of frames set for the respective predetermined control cycles (unit times). The display control section 32B then displays the indicator needle images 21 thus generated by the image generator 32A. That is, the display control section 32B controls the display unit 2 to display, on the display unit 2, the indicator needle images 21 generated for a plurality of frames by the image generator 32A while sequentially switching displayed images thereon from one to another of these indicator needle images 21, thereby displaying the indicator needle as rotating on the image display surface 2a in the form of these indicator needle images 21.

In order to display the indicator-needle motion-blurred image 23, the image generator 32A generates the indicator-needle motion-blurred images 23, based on the rotation amounts per unit time, the start point positions, and the end point positions of the indicator needle that have been calculated, and the entire indicator-needle motion-blurred image 24 stored in the storage unit 31, and the like. More specifically, based on the rotation amounts per unit time, the start point positions, and the end point positions of the indicator needle that have been calculated, and the like, the image generator 32A sequentially generates from the entire indicator-needle motion-blurred image 24, for a plurality of frames set for the respective predetermined control cycles (unit times), the indicator-needle motion-blurred images 23 corresponding to certain respective rotation ranges. That is, as illustrated in FIG. 3, from the entire indicator-needle motion-blurred image 24 stored in the storage unit 31, the image generator 32A sequentially generates the indicator-needle motion-blurred images 23 each representing an afterimage of the indicator needle, the afterimage corresponding to a rotation range within which the indicator needle rotates in the corresponding unit time when the indicator needle is displayed as rotating. In this case, the indicator-needle motion-blurred image 23 is generated, depending on the rotation range per unit time, as a substantially sectorial image that has its center at the shaft line X assumed to be the rotation center of the indicator needle represented by the indicator needle image 21. The indicator-needle motion-blurred image 23 is generated as a substantially sectorial image that, for a larger rotation amount per unit time of the indicator needle, is wider with the length (length of an arch portion on the side opposite to the axial line X) in the direction of the rotation being larger and indicates a higher speed of the indicator needle. To the contrary, the indicator-needle motion-blurred image 23 is generated as a substantially sectorial image that, for a smaller rotation amount per unit time of the indicator needle, is narrower with the length (length of an arch portion on the side opposite to the axial line X) in the direction of the rotation being smaller and indicates a lower speed of the indicator needle. The display control section 32B then displays the indicator-needle motion-blurred images 23 generated by the image generator 32A. That is, the display control section 32B controls the display unit 2 to display, on the display unit 2, the indicator-needle motion-blurred images 23 generated for a plurality of frames by the image generator 32A while sequentially switching these images from one to another, thereby displaying the indicator needle as rotating on the image display surface 2a in the form of the indicator-needle motion-blurred images 23.

When generating the indicator-needle motion-blurred image 23 from the entire indicator-needle motion-blurred image 24, the image generator 32A in one example generates the indicator-needle motion-blurred image 23 with respect to each frame by cutting out a range from the entire indicator-needle motion-blurred image 24 stored in the storage unit 31, the range corresponding to the rotation range per unit time, as illustrated in FIG. 3. The display control section 32B then controls the display unit 2 to display the individual indicator-needle motion-blurred images 23 on the display unit 2 while sequentially switching, from one to another, the indicator-needle motion-blurred images 23 cut out by the image generator 32A for the respective frames. The display control section 32B thus displays ranges of the entire indicator-needle motion-blurred image 24 while changing the ranges from one to the other on a frame-to-frame basis, the ranges needing to be displayed as the indicator-needle motion-blurred images 23. Alternatively, the image generator 32A may generate an image having a mask image superimposed on the entire indicator-needle motion-blurred image 24 stored in the storage unit 31, the mask image having been colored with a background color (for example, black) of the meter image 20, and generate an image including the indicator-needle motion-blurred image 23 by removing, with respect to each frame, a range of the mask image that corresponds to the rotation range per unit time. The display control section 32B then displays, on the display unit 2, the respective images generated for the individual frames by the image generator 32A while sequentially switching these images from one to the next, thus displaying ranges while changing the ranges from one to the next on a frame-to-frame basis, the ranges having the indicator-needle motion-blurred images 23 exposed from the entire indicator-needle motion-blurred image 24 via the removed ranges of the mask image.

Figure 5:
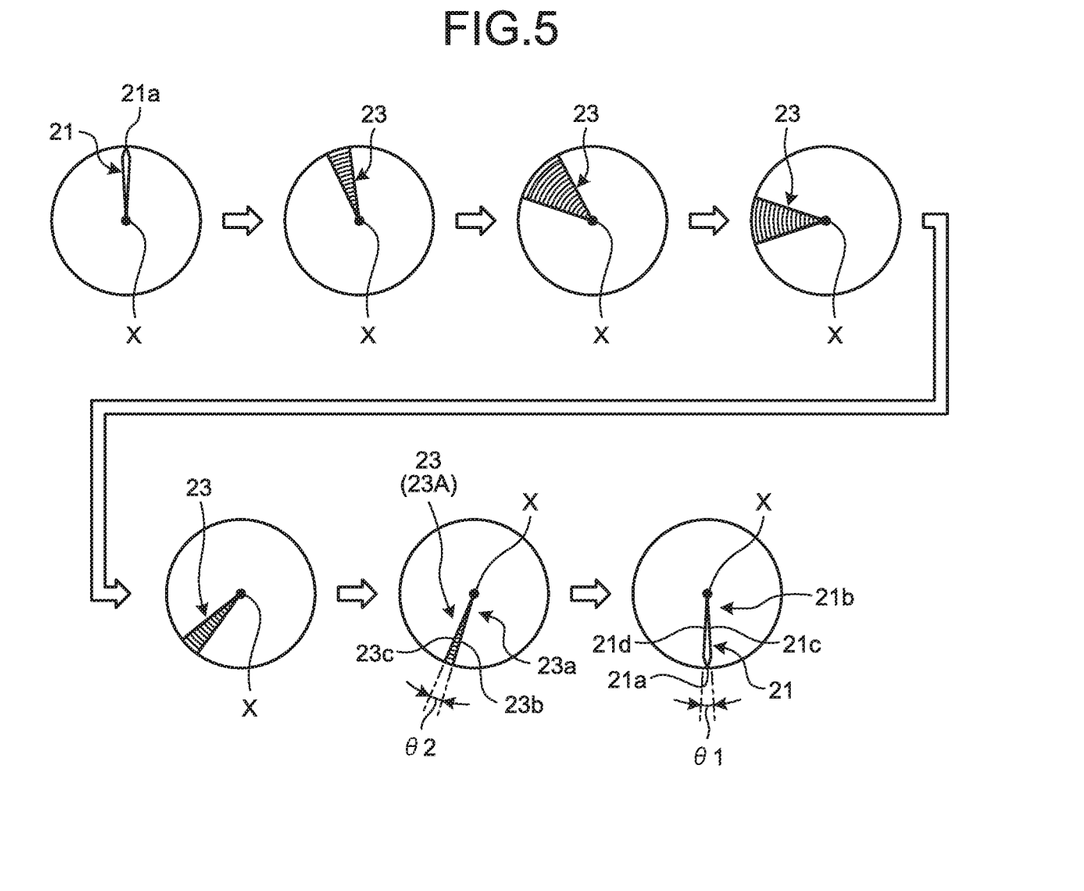
FIG. 5 is a schematic diagram sequentially illustrating examples of displaying an indicator needle on a display device according to the embodiment.

As illustrated in FIG. 1 and FIG. 5, when the indicator needle is unmoving either at the start point position or at the end point position or when a rotation amount per unit time with the indicator needle being displayed as rotating from the start point position to the end point position is relatively small, the image generator 32A in this embodiment generates the index part image 22 and the indicator needle image 21 as display image data for each frame. Based on the generated images, the display control section 32B dynamically displays the indicator needle image 21 on the display unit 2 across a plurality of frames while displaying the index part image 22 in an unmoving state on the display unit 2. Typically, the time when a rotation amount per unit time with the indicator needle being displayed as rotating from the start point position to the end point position is relatively small is when the indicator needle is in a transitioning state either near the start point position or near the end point position, that is, either when the indicator needle has just started to move or when the indicator needle is about to stop. In contrast, when a rotation amount per unit time with the indicator needle being displayed as rotating from the start point position to the end point position is relatively large, the image generator 32A hides the indicator needle image 21 and generates, as display image data for respective frames, the index part image 22 and the indicator-needle motion-blurred images 23 corresponding to rotation ranges per unit time. Based on the generated images, the display control section 32B dynamically displays the indicator-needle motion-blurred images 23 on the display unit 2 across a plurality of frames while displaying the index part image 22 in an unmoving state on the display unit 2. Typically, the time when a rotation amount per unit time with the indicator needle being displayed as rotating from the start point position to the end point position is relatively large is when the indicator needle is in a transitioning state at an intermediate position between the start point position and the end point position.

In the example of FIG. 5, the start point position is a position at which the outer end 21*a* of the indicator needle image 21 representing the indicator needle faces upward in the drawing. In contrast, the end point position is a position at which the outer end 21*a* of the indicator needle image 21 representing the indicator needle faces downward in the drawing after rotating 180 degrees counterclockwise (to the left) about the axial line X from the start point position. The rotation amount per unit time (i.e., the rotation speed) of the indicator needle gradually increases starting from the start point position, is the largest at the intermediate position in the course of rotation of the indicator needle from the start point position to the end point position, and gradually decreases toward the end point portion. Correspondingly, the displayed lengths in the rotation direction (lengths of the arch portions on the sides opposite to the axial line X) of the indicator-needle motion-blurred images 23 are gradually longer from the start point position and then gradually shorter toward the end point position with the longest one at the intermediate position in the course of rotation of the indicator needle from the start point position to the end point position.

Figure 6:
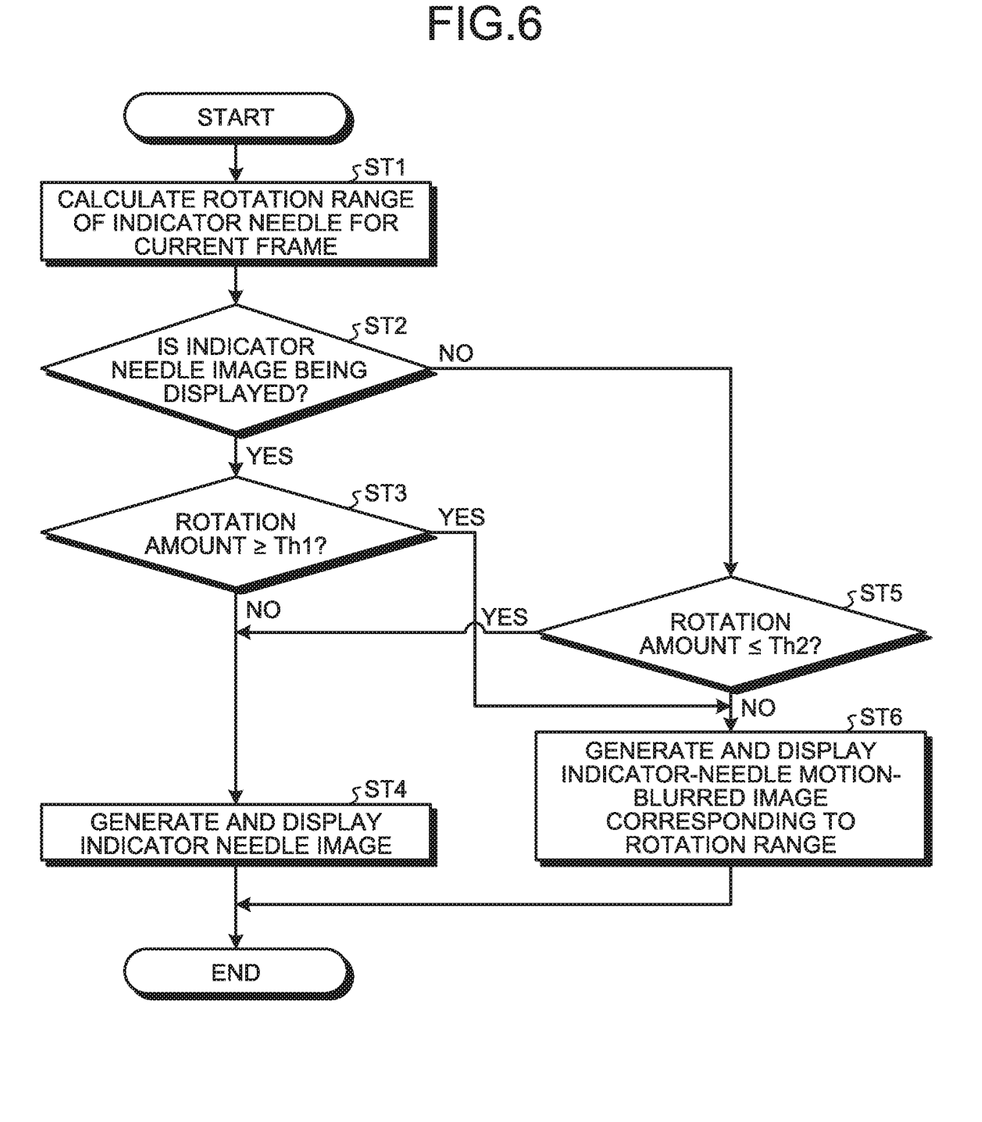
FIG. 6 is a flowchart illustrating an example of display control to be performed by the display device according to the embodiment.

An example of display control to be performed by the control device 3 on the display unit 2 is described next with reference to the flowchart in FIG. 6. Each of these control routines is repeatedly executed in control cycles (clock units) of several to several ten milliseconds, in other words, is repeatedly executed by frame.

First, based on measured values sampled by various pieces of equipment such as sensors and detectors and input from higher-level equipment such as the ECU, the image generator 32A in the control device 3 calculates a start point position, an end point position, and a rotation amount per unit time for displaying, as rotating, the indicator needle represented by the indicator needle image 21 in each frame for the unit time. The image generator 32A then calculates a rotation range per unit time of the indicator needle determined based on the rotation amount per unit time, the start point position, and the end point position of the indicator needle (Step ST1).

Subsequently, the image generator 32A determines whether the indicator needle image 21 is currently displayed on the display unit 2 (Step ST2).

Upon determining in step ST2 that the indicator needle image 21 is currently displayed on the display unit 2 (Yes in Step ST2), the image generator 32A makes a determination in Step ST3. That is, based on the rotation amount per unit time of the indicator needle calculated in Step ST1, the image generator 32A determines whether the rotation amount per unit time of the indicator needle in a frame corresponding to this unit time is an amount not less than the first threshold value Th1 (Step ST3).

Upon determining in Step ST3 that the rotation amount per unit time of the indicator needle in a frame corresponding to this unit time is less than the first threshold value Th1 (No in Step ST3), the image generator 32A performs processing in Step ST4. That is, based on the rotation range per unit time of the indicator needle calculated in Step ST1 and the like, the image generator 32A generates, as display image data from image data stored in the storage unit 31, the index part image 22 and the indicator needle image 21 that has been rotated to a certain rotational position. The display control section 32B in the control device 3 then removes the indicator needle image 21 or indicator-needle motion-blurred image 23 that has been displayed in the previous control cycle, and displays, on the display unit 2, the index part image 22 and the indicator needle image 21 that have been generated by the image generator 32A (Step ST4), thus ending the current control cycle and proceeding to the next control cycle.

Upon determining in step ST3 that the rotation amount per unit time of the indicator needle in a frame corresponding to this unit time is an amount not less than the first threshold value Th1 (Yes in Step ST3), the image generator 32A performs processing in Step ST6. Consequently, the image generator 32A switches indicator needle display on the display unit 2 from the indicator needle image 21 to the indicator-needle motion-blurred image 23.

Upon determining in step ST2 that the indicator needle image 21 is not currently displayed on the display unit 2, that is, the indicator-needle motion-blurred image 23 is currently displayed (No in Step ST2), the image generator 32A makes a determination in Step ST5. That is, based on the rotation amount per unit time of the indicator needle calculated in Step ST1, the image generator 32A determines whether the rotation amount per unit time of the indicator needle in a frame corresponding to this unit time is an amount not more than the second threshold value Th2 (Step ST5).

Upon determining in Step ST5 that the rotation amount per unit time of the indicator needle in a frame corresponding to this unit time is an amount more than the second threshold value Th2 (No in Step ST5), the image generator 32A performs processing in Step ST6. That is, based on the rotation range per unit time of the indicator needle calculated in Step ST1 and the like, the image generator 32A generates, as display image data from image data stored in the storage unit 31, the index part image 22 and the indicator-needle motion-blurred image 23 that corresponds to the rotation range per unit time. In this case, from the entire indicator-needle motion-blurred image 24 stored in the storage unit 31, the image generator 32A generates the indicator-needle motion-blurred image 23 that corresponds to the rotation range per unit time. The display control section 32B then removes the indicator needle image 21 or indicator-needle motion-blurred image 23 that has been displayed in the previous control cycle, and displays, on the display unit 2, the index part image 22 and the indicator-needle motion-blurred image 23 that have been generated by the image generator 32A (Step ST6), thus ending the current control cycle and proceeding to the next control cycle.

Upon determining in Step ST5 that the rotation amount per unit time of the indicator needle in a frame corresponding to this unit time is an amount not more than the second threshold value Th2 (Yes in Step ST5), the image generator 32A proceeds to the processing in Step ST4. Consequently, the image generator 32A switches indicator needle display on the display unit 2 from the indicator-needle motion-blurred image 23 to the indicator needle image 21.

As described above, the display device 1 in this embodiment is directed to, with the indicator needle image 21 having a certain shape, reducing incongruity in a configuration such that displayed images are switched from one to the other of the indicator needle image 21 and the indicator-needle motion-blurred image 23. That is, the display device 1 in this embodiment has a configuration such that the indicator needle image 21 has a shape corresponding to the indicator-needle motion-blurred image 23 (see FIG. 3) that corresponds to a minimum rotation amount per unit time when the indicator needle is displayed as rotating. This configuration enables the display device 1 to reduce incongruity that is felt when displayed images are switched from one to the other of the indicator needle image 21 and the indicator-needle motion-blurred image 23.

Specifically, as illustrated in FIG. 2, FIG. 3, and FIG. 5, the indicator needle image 21 in this embodiment has a shape that tapers toward the rotation center (the axial line X), and is displayed as an image formed so as to have an indicator-needle inner end angle $\theta$ equal to a minimum motion-blurred inner end angle $\theta 2$.

The indicator-needle inner end angle $\theta 1$ herein is an angle formed by two sides 21c and 21d of the indicator needle image 21 that form the inner end 21b thereof tapering toward the rotation center, as illustrated in FIG. 2. The two sides 21c and 21d forming the inner end 21b are lines constituting parts of the external line (outline) of the indicator needle image 21. Each of those two sides 21c and 21d in this embodiment has one end thereof that faces the rotation center extending until it reaches the rotation center, in other words, extends radially from the rotation center. The indicator-needle inner end angle $\theta 1$ corresponds to an acute angle formed by those two sides 21c and 21d on one side thereof facing the rotation center, more specifically, the center angle of the indicator needle image 21 on the rotation center side thereof.

The minimum motion-blurred inner end angle $\theta 2$ is an angle based on the indicator-needle motion-blurred image 23 (hereinafter referred to also as "minimum indicator-needle motion-blurred image 23A") that corresponds to a minimum rotation amount per unit time when the indicator needle is displayed as rotating, as illustrated in FIG. 3. The minimum motion-blurred inner end angle $\theta 2$ is an angle formed by two sides 23b and 23c of the minimum indicator-needle motion-blurred image 23A that form an inner end 23a thereof on the rotation center side thereof. As illustrated in FIG. 5, the minimum indicator-needle motion-blurred image 23A is, typically, one of the indicator-needle motion-blurred images 23 that appear immediately before displayed images are switched to the indicator needle image 21 from the indicator-needle motion-blurred image 23 in accordance with a rotation amount per unit time when the indicator needle is displayed as rotating. The minimum indicator-needle motion-blurred image 23A herein is one of the indicator-needle motion-blurred images 23 that appears immediately before displayed images are switched to the indicator needle image 21 from the indicator-needle motion-blurred image 23 in response to decrease to the second threshold value Th2 or less of the rotation amount per unit time of the indicator needle being displayed as rotating. That is, the minimum indicator-needle motion-blurred image 23A is one of the indicator-needle motion-blurred images 23 that represent a state that the indicator needle displayed as rotating enters when having the lowest rotation speed. The minimum motion-blurred inner end angle $\theta 2$ is an angle formed by the two sides 23b and 23c forming the inner end 23a of the minimum indicator-needle motion-blurred image 23A that appears immediately before displayed images are switched to the indicator needle image 21 from the indicator-needle motion-blurred image 23 in response to decrease to the second threshold value Th2 or less of the rotation amount per unit time of the indicator needle being displayed as rotating. The two sides 23b and 23c forming the inner end 23a are lines constituting parts of the external line (outline) of the minimum indicator-needle motion-blurred image 23A. Each of those two sides 23b and 23c in this embodiment has one end thereof that faces the rotation center extending until it reaches the rotation center, in other words, extends radially from the rotation center. The minimum motion-blurred inner end angle $\theta 2$ corresponds to an acute angle formed by those two sides 23b and 23c on the rotation center side of those sides, more specifically, the center angle of the minimum indicator-needle motion-blurred image 23A formed in a substantially sectorial shape.

The storage unit 31 in this embodiment stores therein the indicator needle image 21 that is formed with the indicator-needle inner end angle $\theta 1$ equal to the minimum motion-blurred inner end angle $\theta 2$. When displaying the indicator needle image 21 stored in the storage unit 31 on the display unit 2, the controller 32 displays, on the display unit 2, the indicator needle image 21 that is formed with the indicator-needle inner end angle $\theta 1$ equal to the minimum motion-blurred inner end angle $\theta 2$.

The display device 1 described above enables the controller 32 to control the display unit 2 so that displayed images thereon can be switched from one to another of the indicator needle image 21 and the indicator-needle motion-blurred images 23, depending on how large the rotation amount per unit time of the indicator needle being displayed as rotating. This control enables the display device 1 to dynamically represent the movement of the indicator needle while providing thereto a sense of speed, and thereby appropriately represent the movement of the indicator needle. In this case, the display device 1 enables the controller 32 to control the display unit 2 so that the indicator needle image 21 can be displayed with the indicator-needle inner end angle $\theta 1$ thereof equal to the minimum motion-blurred inner end angle $\theta 2$ of the indicator-needle motion-blurred image 23. This control enables the display device 1 to, when switching displayed images from one to another of the indicator needle image 21 and the indicator-needle motion-blurred images 23, prevent change in width of parts (rotation-supporting portions) thereof facing the rotation center (the axial line X) and thus switch the displayed images smoothly. Thus, the display device 1 can reduce incongruity that is felt when displayed images are switched from one to the other of the indicator needle image 21 and the indicator-needle motion-blurred image 23. Consequently, the display device 1 can appropriately display an indicator needle when displaying the indicator needle while switching displayed images from one to the other of the indicator needle image 21 and the indicator-needle motion-blurred image 23.

Furthermore, the display device 1 described above enables the controller 32 to control the display unit 2 so that, if the rotation amount per unit time of the indicator needle being displayed as rotating has increased to the first threshold value or more, displayed images are switched from the indicator needle image 21 to the indicator-needle motion-blurred image 23. In contrast, the display device 1 enables the controller 32 to control the display unit 2 so that, if the rotation amount per unit time of the indicator needle being displayed as rotating has become equal to or less than the second threshold value smaller than the first threshold value, displayed images can be switched from the indicator-needle motion-blurred image 23 to the indicator needle image 21. This control enables the display device 1 to reduce incongruity felt about when to switch displayed images from the indicator needle image 21 to the indicator-needle motion-blurred image 23 and when to switch from the indicator-needle motion-blurred image 23 to the indicator needle image 21. Consequently, the display device 1 can switch displayed images from the indicator needle image 21 to the indicator-needle motion-blurred image 23 and from the indicator-needle motion-blurred image 23 to the indicator needle image 21, congruently. For example, the display device 1 can prevent the movement of the indicator needle represented on the display unit 2 from appearing to be flashing when displayed images are switched from the indicator-needle motion-blurred image 23 to the indicator needle image 21 with the rotation speed of an indicator needle represented being gradually slowed down. On top of that, the display device 1 can make the indicator-needle inner end angle θ1 of the indicator needle image 21 equal to the minimum motion-blurred inner end angle θ2 of the minimum indicator-needle motion-blurred image 23A, which appears immediately before the switching to the indicator needle image 21 when, with the rotation speed of the represented indicator needle further slowed down, it has become easy to recognize a part of the indicator needle facing the rotation center. This configuration enables the display device 1 to more reliably reduce incongruity that is felt when displayed images are switched from one to the other of the indicator needle image 21 and the indicator-needle motion-blurred image 23.

When displaying the indicator-needle motion-blurred image 23, the display device 1 described above enables the controller 32 to display, from the entire indicator-needle motion-blurred image 24 stored in the storage unit 31, the indicator-needle motion-blurred image 23 that corresponds to a rotation range per unit time of the indicator needle being displayed as rotating. Thus, unlike a case in which images representing afterimages of the indicator needle are corrected and generated individually corresponding to respective rotation ranges in unit times, for example, the display device 1 can minimize the amount of calculation and thereby eventually minimize a computational load. On top of that, the display device 1 can reduce incongruity that is felt when displayed images are switched from one to the other of the indicator needle image 21 and the indicator-needle motion-blurred image 23.

The above-described display device according to the embodiment of the present invention is not limited by the above-described embodiment and can be various changed within the scope of the appended claims.

Figure 7:
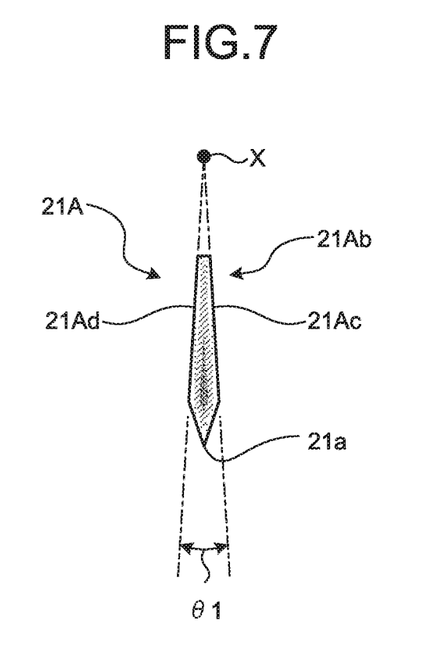
FIG. 7 is a schematic diagram illustrating an example of an indicator needle image on a display device according to a modification.

The indicator needle image 21 has been described above as one being entirely uniformly colored as illustrated in FIG. 2, but is not limited to this example. For example, an indicator needle image 21A illustrated in FIG. 7 as a modification has a central part most darkly colored and has other parts colored gradationally in a manner such that an outer part is more lightly colored. In this case, while having, similarly to the indicator needle image 21, a shape tapering toward an inner end 21Ab that faces the rotation center, the indicator needle image 21A appears as an image having two sides 21Ac and 21Ad forming the inner end 21Ab while each of these two sides 21Ac and 21Ad has, apart from the rotation center, an end thereof facing the rotation center. Even in this case, the indicator-needle inner end angle θ1 is an angle formed by the two sides 21Ac and 21Ad of the indicator needle image 21A that form the tapering inner end 21Ab facing the rotation center. In this case, the indicator-needle motion-blurred image 23 and the entire indicator-needle motion-blurred image 24 are also formed as images gradationally colored in accordance with gradation with which the indicator needle image 21A is colored. Even in this case also, the minimum motion-blurred inner end angle θ2 is preferably an angle formed by the two sides 23b and 23c of the minimum indicator-needle motion-blurred image 23A that form the inner end 23a thereof facing the rotation center, similarly to the above embodiment. The display device 1 can represent the movement of the indicator needle using, for example, the gradationally colored indicator needle image 21A illustrated in FIG. 7 and the indicator-needle motion-blurred image 23 colored accordingly and thereby blur the representation of a part (rotation-supporting portion) of the indicator needle that faces the rotation center. Consequently, the display device 1 can further reduce incongruity that is felt when displayed images are switched from one to the other of the indicator needle image 21A and the indicator-needle motion-blurred image 23. In this case, the indicator needle image 21A and the indicator-needle motion-blurred image 23 may be directly gradationally colored or may be each gradationally colored with mask images superimposed on an entirely uniformly colored image, the mask images corresponding to the gradation.

The indicator-needle motion-blurred image 23 has been described above as an image generated based on the entire indicator-needle motion-blurred image 24, but is not limited to this example. The controller 32 may generate, not based on the entire indicator-needle motion-blurred image 24, the indicator-needle motion-blurred images 23 as images representing afterimages of the indicator needle by individually correcting, in accordance with rotation ranges per unit time of the indicator needle, the indicator-needle motion-blurred image 23 that serves as a benchmark, and display these corrected indicator-needle motion-blurred image 23 on the display unit 2.

The controller 32 has been described as being configured to switch between display of the indicator needle using the indicator needle images 21 and display thereof using the indicator-needle motion-blurred images 23, based on the first threshold value Th1 and the second threshold value Th2 that is smaller than the first threshold value Th1, but is not limited to this example. The controller 32 may switch from display of the indicator needle using the indicator needle images 21 to display thereof using the indicator-needle motion-blurred images 23 and switch from display thereof using the indicator-needle motion-blurred images 23 to display thereof using the indicator needle images 21, based on a single common threshold value. Even in this case also, the indicator needle image 21 is preferably formed so as to have the indicator-needle inner end angle θ1 thereof equal to the minimum motion-blurred inner end angle θ2 of the indicator-needle motion-blurred image 23 that corresponds to when the rotation amount per unit time of the indicator needle being displayed as rotating is the smallest.

The storage unit 31 has been described as one of the components included in the control device 3 but is not limited to this example, and may be provided as a storage unit outside of the control device 3 and separately from the control device 3.

The display device 1 has been described as an apparatus applied to vehicles but is not limited to such an example, and may be applied to equipment other than vehicles.

A display device according to the present embodiment enables a controller to control a display unit so that displayed images thereon can be switched from an indicator needle image to an indicator-needle motion-blurred image or from an indicator-needle motion-blurred image to an indicator needle image, depending on how large the rotation amount per unit time of the indicator needle being displayed as rotating. In this case, the display device enables the controller to control the display unit so that the indicator needle image can be displayed with an indicator-needle inner end angle of the indicator needle image equal to the minimum motion-blurred inner end angle of the indicator-needle motion-blurred images. This control enables the display device to reduce incongruity that is felt when switching between display of the indicator needle image to display of the indicator-needle motion-blurred images, thus producing the effect of appropriately displaying an indicator needle when the indicator needle is displayed with switching between display of the indicator needle image and display of the indicator-needle motion-blurred images.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a display unit that displays an image;
a storage unit configured to store therein an indicator needle image representing an indicator needle, and an indicator-needle motion-blurred image representing an afterimage that the indicator needle makes when rotating; and
a controller configured to control the display unit in a manner such that, when the indicator needle is displayed as rotating with a relatively small rotation amount per unit time, the indicator needle image is displayed while being rotated, and when the indicator needle is displayed as rotating with a relatively large rotation amount per unit time, the indicator-needle motion-blurred image that corresponds to a rotation range per unit time of the indicator needle is displayed, wherein
the indicator needle image has a shape tapering toward a center of rotation thereof, and
an indicator-needle inner end angle formed by two sides of the indicator needle image that form an end thereof that faces the center of the rotation is equal to a minimum motion-blurred inner end angle formed by two sides of the indicator-needle motion-blurred image that has the smallest rotation amount per unit time while the indicator needle is displayed as rotating, the two sides forming an end of the indicator-needle motion-blurred image that faces the center of the rotation, and
with the indicator needle image being displayed, if a rotation amount per unit time of the indicator needle being displayed as rotating has increased to the indicator-needle inner end angle or more, the controller controls the display unit so that the indicator needle image is hidden and displayed images thereon are switched from the indicator needle image to the indicator-needle motion-blurred images, including the indicator-needle motion-blurred image,
wherein a triangular shape of an end of the indicator needle image is removed from the indicator-needle motion blurred image,
wherein the indicator-needle motion blurred image comprises a sectorial shape that increases and decreases sequentially based on a rotation amount per unit time changing between from the relatively small rotation amount per unit time to the relatively large rotation amount per unit time, and
wherein the sectorial shape comprises at least an entire sector of circular portion of the image.

2. The display device according to claim 1, wherein
when the rotation amount per unit time of the indicator needle being displayed as rotating has increased to a first threshold value or more, the controller controls the display unit in a manner such that an image displayed on the display unit is switched from the indicator needle image to the indicator-needle motion-blurred image, and
when the rotation amount per unit time of the indicator needle being displayed as rotating has become a second threshold value or less, the controller controls the display unit in a manner such that an image displayed on the display unit is switched from the indicator-needle motion-blurred image to the indicator needle image, the second threshold value being smaller than the first threshold value, and
the minimum motion-blurred inner end angle is an angle formed by two sides of the indicator-needle motion-blurred image that is displayed immediately before the displayed image is switched from the indicator-needle motion-blurred image to the indicator needle image in response to decrease to the second threshold value or less of a rotation amount per unit time of the indicator needle being displayed as rotating, the two sides forming an inner end of the indicator-needle motion-blurred image, the inner end being close to the center of the rotation.

3. The display device according to claim 1, wherein the controller is further configured to control the display such that, in response to a determination that the minimum motion-blurred inner end angle is less than or equal to the indicator-needle inner end angle, the display of the indicator-needle motion-blurred image is replaced with the display of the indicator needle.

4. The display device according to claim 1, wherein the indicator-needle inner end angle and the minimum motion-blurred inner end angle share vertices at a center of the display.

5. The display device according to claim 3, wherein the controller is further configured to control, the display unit such that, in response to a determination that the minimum motion-blurred inner end angle is greater than or equal to the indicator-needle inner end angle the display of the indicator needle is replaced with the display of the indicator-needle motion-blurred image.

\* \* \* \* \*